July 12, 1960     M. W. HUBER     2,944,430
BEARING
Filed March 23, 1956

INVENTOR
Matthew W. Huber
BY
ATTORNEYS

United States Patent Office 2,944,430
Patented July 12, 1960

2,944,430
BEARING

Matthew W. Huber, Watertown, N.Y., assignor to The New York Air Brake Company, a corporation of New Jersey Filed Mar. 23, 1956, Ser. No. 573,420
1 Claim. (Cl. 74—60)

This invention relates to anti-friction bearings. Specifically it relates to a bearing designed to sustain radial as well as axial thrust.

In fluid engines of the swash plate type it is common practice to provide a thrust plate carried adjacent the oblique face of the swash plate. This thrust plate is commonly carried by an anti-friction bearing. In swash plate type fluid engines the pistons are arranged in circular series around the axis of rotation and have their axes substantially parallel to the axis of rotation of the shaft. Because of the obliquity of the thrust plate engaged by the pistons, two force components for each piston result. One is perpendicular to the face of the swash plate and the other acts in a direction parallel with the radius through the high point of the swash plate.

The present invention concerns an improved anti-friction bearing in which the last-named component is taken up at two points between surfaces which rotate relatively to one another instead of being taken up at one point.

The bearing comprises opposed races formed respectively on the rear face of an annular thrust plate and on the oblique face of the swash plate. A cylindrical journal projects from the oblique face of the swash plate with its axis normal to said face. A bearing cage is journalled thereon. A projecting journal is formed on the cage and the annular thrust plate is journalled thereon. The cage has recesses in which are confined rolling anti-friction members which engage the races on the thrust plate and the swash plate.

The cage will rotate on the cylindrical journal at a rate which is intermediate the rotary speeds of the thrust plate and of the swash plate. The radial thrust is borne by the journals formed on the swash plate and the bearing cage and the wear is divided between these two journals. This wear will therefore occur between surfaces having a smaller speed difference between them than in prior art devices in which a journal on the swash plate was directly engaged by the thrust plate and took all the wear. The bearing is therefore suited for use in devices having higher rotary speeds and will give longer life even if the rotary speeds are not increased.

The invention will be described having reference to the accompanying drawing in which.

Figure 1:
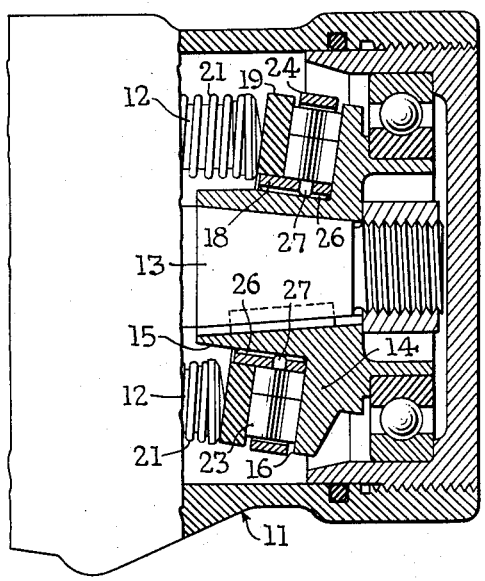
Fig. 1 is a fragmentary axial section showing the preferred embodiment of the invention in a rotary swash plate type of fluid engine.
Figure 2:
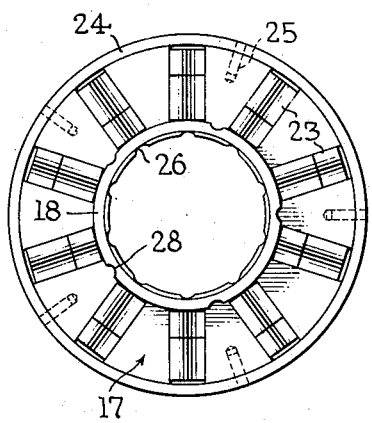
Fig. 2 is a plan view of a bearing embodying the invention.
Figure 3:
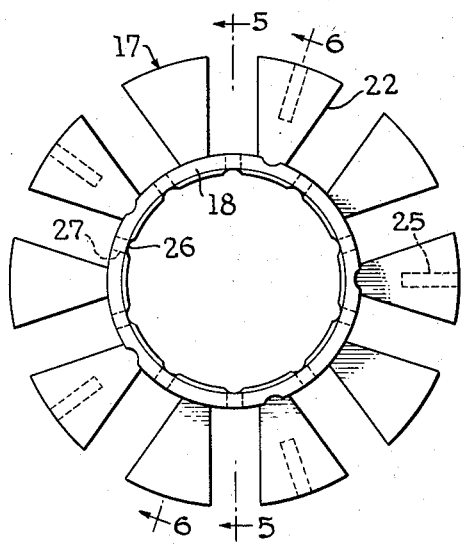
Fig. 3 is a plan view of the bearing cage.
Figures 5, 6:
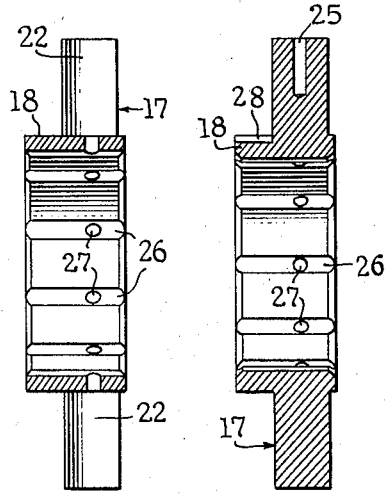
Fig. 5 is a sectional view taken on the line 5—5 of Fig. 3.
Fig. 6 is a section view on the line 6—6 of Fig. 3.
Figure 4:
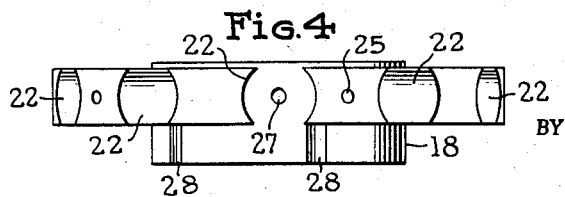
Fig. 4 is a side elevation of the cage.

Referring to Fig. 1 the rotary engine includes a housing part of which appears at 11. A cylinder block, not shown, is mounted in the housing and has a plurality of parallel cylinder bores therein. A piston, two of which appear at 12, is reciprocable in each of these bores. A shaft 13 is journalled in the cylinder block with its axis parallel with the axes of said bores. A swash plate 14 is secured to shaft 13. A cylindrical journal 15 extends from the swash plate 14 and is normal to its oblique face. A bearing race 16 is formed on this oblique face. A bearing cage 17 has an inner bearing surface journalled on the journal 15. A journal 18 coaxial with this bearing surface projects from the bearing cage 17 and has journalled thereon an annular thrust plate 19. The pistons 12 react upon and are biased against thrust plate 19 by springs 21.

Referring particularly to Figs. 2 through 6, the cage 17 includes an annular portion in which a plurality of radial bores 22 are formed which bores confine multi-part anti-friction rollers 23.

The outer periphery of the cage 17 is encircled by a band 24 which confines the rollers 23 against radial escape. This band 24 is pinned to the cage 17 by pins which pass through the band 24 into bores 25 formed in the cage 17 for that purpose. The inner bearing surface formed on the cage 17 is provided with a plurality of oil grooves 26 each of which is intersected by drilled ports 27 which extend between the grooves 26 and the inner end of each of the radial bores 22. A plurality of oil grooves 28 is formed in the surface of the journal 18.

It will be seen that the radial thrust exerted through the thrust-plate 19 is carried by the journal 18 which is formed on the cage and is transmitted by the cage to the journal 15. It will also be apparent that the cage 17 will have a rotary speed which is intermediate of the rotary speed of the thrust plate 19 and of the swash plate 14. Wear will occur between the inner periphery of the annular thrust plate 19 and the journal 18 and between the inner bearing surface formed on the cage 17 and the journal 15.

The speed differential at each of these wear points is less than the speed differential between an annular wear plate which is in direct contact with a journal formed on the swash plate. Since the speed differential between the wearing surfaces is reduced, the bearing will have a longer life and is suited to use with higher rotary speeds and loads.

What is claimed is:

The combination of a rotary shaft; a swash plate fixed on said shaft and having a bearing race lying in a plane inclined to the shaft axis, said swash plate including an inclined journal whose axis is centered on said race and normal to the plane thereof; a cage having pockets for spacing rolling anti-friction members, said cage including a bearing sleeve and a projecting journal coaxial with said bearing sleeve, said bearing sleeve guiding the cage in rotary motion about said inclined journal; rolling anti-friction members rotatable in said pockets and engaging said race; and an annular thrust plate having a bearing portion engaging and rotatable on the second-named journal, and having a race opposed to the first-named race and engaging said anti-friction members.

References Cited in the file of this patent

UNITED STATES PATENTS

| 1,659,374 | Robson | Feb. 14, 1928 |
| 1,746,335 | Boyce | Feb. 11, 1930 |
| 1,993,900 | Rumpel | Mar. 12, 1935 |
| 2,117,633 | Smith | May 17, 1938 |
| 2,140,818 | Stein | Dec. 20, 1938 |
| 2,374,595 | Franz | Apr. 24, 1945 |
| 2,545,562 | Thiel | Mar. 20, 1951 |
| 2,718,440 | Brinkmann | Sept. 20, 1955 |